May 3, 1960 J. R. ANDERSON 2,935,567

COIN COLLECTOR CIRCUITS FOR TELEPHONE SYSTEMS

Filed June 10, 1957

INVENTOR
J. R. ANDERSON
BY [signature]
ATTORNEY 2,935,567
Patented May 3, 1960

2,935,567

COIN COLLECTOR CIRCUITS FOR TELEPHONE SYSTEMS

John R. Anderson, Kettering, Ohio, assignor to Bell Telephone Laboratories, Incorporated, New York, N.Y., a corporation of New York Application June 10, 1957, Serial No. 664,599
19 Claims. (Cl. 179—6.3)

Figure 1:
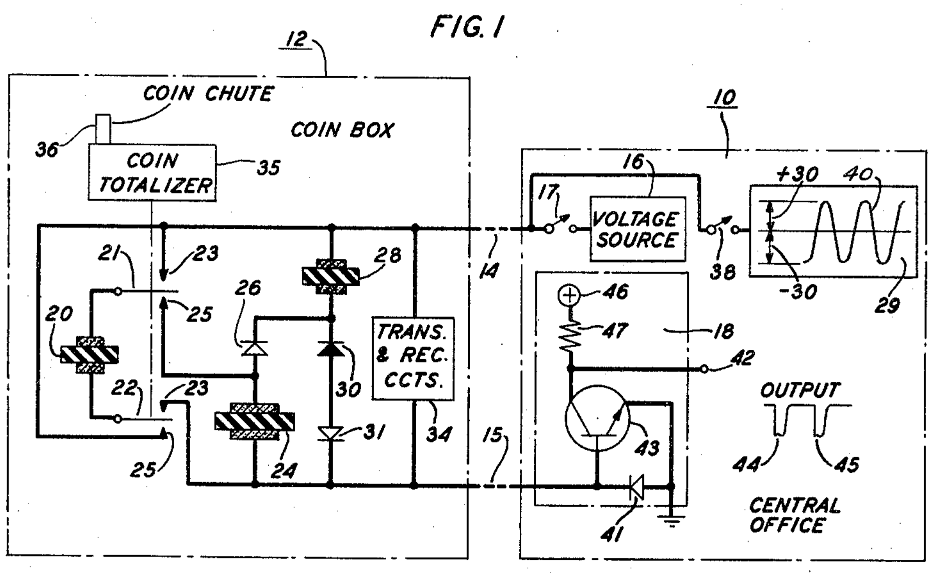

This invention relates to electrical signaling circuits and more particularly to such circuits for indicating the value of coins deposited in a coin collector telephone subset.

In telephone systems it is well known to provide pay stations at which one may place a call into the system by the deposit of an appropriate number of coins into a coin box associated with the telephone instrument itself. In order to enable calls to any location to be placed from a pay station an operator in the remote central office must be advised of the amount of money deposited, which amount will, of course, vary for calls to different cities and stations. It is therefore necessary that there be in the coin box or pay station a coin totalizer, which will sum up the value of the coins, regardless of the number or size of the coins deposited, and equipment to signal this value to the operator at the central office.

Present-day mechanical coin totalizers are known which accurately translate the monetary value of the deposited coins into an angular rotation of a shaft which, by the provision of properly shaped cams or discs on the shaft, can effect a number of openings of electrical contacts. It is then only necessary to provide an electrical circuit to transmit signals to the central office dependent on the number of openings and closures of these contacts and therefore indicative of the monetary total of the coins deposited in the coin box.

It is an object of this invention to provide an improved coin collector signaling circuit.

It is another object of this invention to reduce the number of parts required for coin collector circuits and to simplify such circuits.

Briefly, in accordance with my invention, a ferroelectric capacitor is connectable through movable contacts to both sides or wires of the telephone line to the pay station. A second ferroelectric capacitor is also connected to the first ferroelectric capacitor by these contacts. The first capacitor has a relatively small electrode area, while the second capacitor has an electrode area considerably larger and at least as many times larger as the largest number of coin units to be identified. The coin unit may be five cents and the signaling capacity of the circuit may be, in one embodiment, two dollars, or forty times as large.

On each recognition of the deposit of a unit value coin, the contacts are closed in first one direction and then in the other direction. A voltage is applied to one wire of the telephone line at the central office, advantageously when the receiver is removed and the central office recognizes the off-hook condition existing at the pay station. On the closure of the contacts, due to the mechanical action of the coin totalizer, the state of polarization of the first or unit capacitor is reversed. Then on the subsequent reversal of the contacts, the remanent polarization of the first capacitor is returned to its initial state and a unit amount of charge is transferred to and stored in the second ferroelectric capacitor. This procedure continues a number of times, dependent on the value of the deposited coins.

When the final amount of coins has been collected, the voltage at the central office is removed and a source of alternating drive pulses is applied to the one wire of the telephone line. A suitable detector circuit is connected to the other wire of the line. In accordance with another aspect of my invention, the second ferroelectric capacitor is then connected across the telephone line through a charge-metering ferroelectric capacitor. In one specific illustrative embodiment this may be a third ferroelectric capacitor of unit electrode area, and in another specific illustrative embodiment the contacts and circuit are arranged so that the first capacitor can also serve as the read-out charge-metering capacitor.

A double diode, one of which is a reverse breakdown or saturation diode, sometimes referred to as a Zener diode, is connected across the second capacitor, and the circuit is arranged so that the charge-metering capacitor has its remanent polarization reversed and then reset during each cycle of the driving read-out pulses, whereas the larger storage capacitor is only affected during one polarity of the drive pulses. In this way the stored charge on the second ferroelectric capacitor is removed in metered or unit increments and the number of pulses transmitted to the central office is accurately determined and will be indicative of the monetary value of the coins deposited in the coin box.

It is a feature of this invention that a coin collector subset circuit comprise a first ferroelectric capacitor connected through movable contacts to both sides of the telephone line and a second ferroelectric capacitor of larger electrode area selectively connected by the contacts to the first capacitor.

It is another feature of this invention that the stored charge on the second capacitor be removed through a charge-metering capacitor, which may be either a third capacitor or the first capacitor, upon application of drive signals from the central office.

It is a further feature of this invention that the connections of the first ferroelectric capacitor to the telephone line be reversed in response to the monetary value of coins deposited in the coin box.

Figure 2:
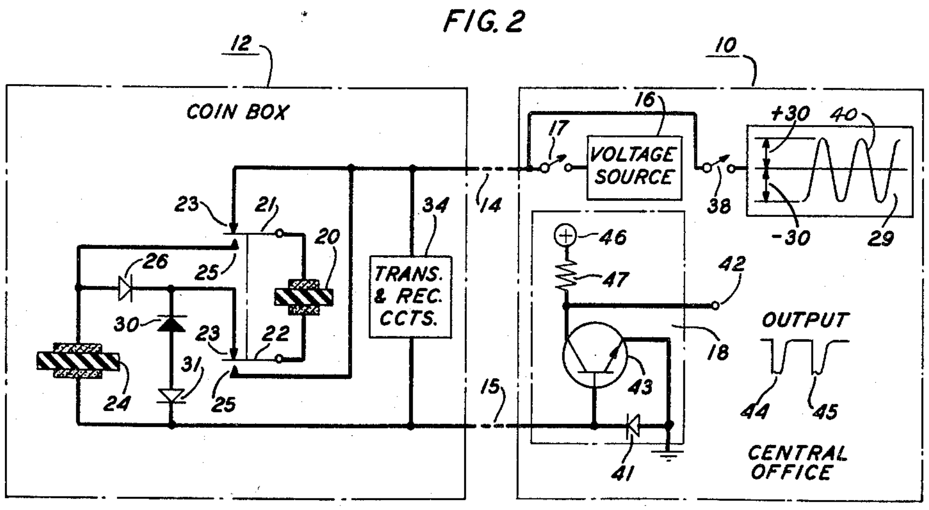

A complete understanding of this invention and of these and various other features thereof may be gained from consideration of the following detailed description and the accompanying drawing, in which:

Fig. 1 is a schematic representation of one illustrative embodiment of my invention; and Fig. 2 is a schematic representation of an alternative illustrative embodiment of my invention.

Referring now to Fig. 1, there is depicted a central office represented generally by block 10 and a coin collector subset circuit indicated generally by block 12 which is connected through lines 14 and 15 to the central office. The central office includes a source 16 of positive voltage which may be connected through some suitable means, such as a relay or switch 17, to the line 14. The central office also includes a pulse-detector circuit 18 which detects the pulses delivered from the coin collector subset over line 15 in a manner which will be subsequently explained. The coin collector subset circuit includes ferroelectric capacitor 20 connected through movable armatures 21 and 22 to contacts 23 and 25 and thus to lines 14 and 15. In their normal or unoperated position armatures 21 and 22 are not closed to either contacts 23 or 25 but are positioned between them. The movable armatures 21 and 22 are connected together through a suitable insulator so that they move in unison to reverse the connection of capacitor 20 with respect to lines 14 and 15.

A ferroelectric capacitor 24 is connected to contact 25 associated with movable armature 21. Capacitor 24 is also connected through a diode 26 to a metering ferroelectric capacitor 28. Capacitor 28 and diode 26 serve as a discharge path to permit the reversal of the remanent polarization of capacitor 24 in response to pulses from a driving pulse source 29 in the central office in a manner which will be subsequently explained. A saturation diode 30 and ordinary diode 31 are serially connected between ferroelectric capacitor 28 and line 15 to provide a path for the reversal of the remanent polarization of capacitor 28 in response to these driving pulses.

The transmitter and receiver circuits of the subset are generally indicated by block 34 connected to lines 14 and 15. These transmitter and receiver circuits may be any convenient type known in the art.

The armatures 21 and 22 are moved in response to deposit of coins in the chute 36 by action of the mechanical coin totalizer 35. Totalizer 35 may be of any of the number of types known in the art. One specific totalizer that may be employed is of the type described in application Serial No. 518,070, filed June 27, 1955, of William Pferd, and in application Serial No. 591,116, filed June 13, 1956, of Goodale and Pferd. In totalizers of this type a shaft rotates a number of degrees depending on the value of the coin deposited. After deposit of each coin the shaft maintains its angular rotation until the mechanism is released so that the total rotation of the shaft is dependent on the total monetary value of the deposited coins. Advantageously, armatures 21 and 22 would be actuated by two distinct cams mounted adjacent each other on the rotating shaft, the cams having an upper and a lower actuating position, for closure of the armatures to contacts 23 and 25, and an intermediate open position. The initial rotation of the shaft could be maintained during the entire call and be released only on termination of the call, when actuation of the contacts by rotation of the cams back to their initial position would be ineffective to disturb the telephone line. Such release could be effected by a catch worked directly from the switch hook or by a lever on the coin collect relay magnet operated on the collect voltage being applied to the line by the operator at the central office.

The manner of operation of the circuit of Fig. 1 is as follows. When the receiver, not shown, is lifted, establishing a direct current path from the central office over the line 14 through transmitter and receiver circuits 34 and back to the central office over line 15, the voltage source 16 is connected, as by the contacts 17 of a relay, to line 14 and applies a sustained positive pulse to line 14. At this time the subscriber deposits a coin such as a dime in the coin chute 36. The dime causes operation of the totalizer 35, in a manner as described above, to actuate contacts 21 and 22 so that they are transferred to their upper contacts 23, then to their lower contacts 25, back to their upper contacts 23, to their lower contacts 25, and then to their middle or unoperated position. The first application of the positive voltage on line 14 through contact 23 and armature 21 to ferroelectric capacitor 20 causes it to be polarized in one direction; when armatures 21 and 22 are moved to their lower contacts 25, the connections of ferroelectric capacitor 20 are reversed with respect to the positive voltage from source 16. In response to this reversal, the remanent polarization of ferroelectric capacitor 20 is reversed through ferroelectric capacitor 24. The electrode area of ferroelectric capacitor 24 is many times as large as that of ferroelectric capacitor 20, as of the order of twenty or forty times, depending on the desired coin capacity of the circuit. As disclosed and described in detail in R. M. Wolfe application Serial No. 552,459, filed December 12, 1955, now Patent 2,854,590, granted September 30, 1958, when two capacitors of dissimilar electrode areas are serially connected, the remanent polarization of the smaller capacitor may be reversed into the larger of the ferroelectric capacitors a number of times equal to the integral multiple of the electrode areas of these two capacitors.

For example, if capacitor 24 has an electrode area twenty times that of capacitor 20, then the polarization of capacitor 20 may be reversed twenty times into ferroelectric capacitor 24 provided, of course, that a resetting path is provided for ferroelectric capacitor 20 after each of its reversals. Here such a resetting path is provided each time the switch armatures 21 and 22 are actuated to their upward contacts 23. The second actuation of the switch contacts 21 and 22 in response to the dime falling through the coin chute again connects ferroelectric capacitor 20 to ferroelectric capacitor 24, and the positive voltage from source 16 causes ferroelectric capacitor 20 to again be reversed into ferroelectric capacitor 24.

At this time the person placing the call has deposited his coin, and its monetary value has been recognized by the mechanical totalizer 35 and electrically stored in the ferroelectric capacitor 24. However, before the next step can be taken it is necessary for this information to be transferred to the central office. In accordance with my invention this is attained by connecting a source 29 of sine wave driving pulses to the line 14 by means of contacts or switch 38 in place of the voltage source 16, the switch 17 thus being opened. This may be done a predetermined time interval after the last switching of the capacitor 20, such as, for example, after a period of thirty seconds. The first negative pulse of the driving signal causes the ferroelectric capacitor 24 to be partially reversed through diode 26 and the charge-metering ferroelectric capacitor 28. The next positive pulse or half cycle of the sine wave causes the remanent polarization of ferroelectric capacitor 28 to be reversed through Zener diode 30 and ordinary diode 31 causing a first pulse to be delivered through line 15 and detected by the detecting circuit 18 and delivered to output terminal 42 as pulse 44. In response to the next negative pulse of wave 40, the remainder of the domains of ferroelectric capacitor 24 which were previously switched by the operation of capacitor 20 are switched through diode 26 into ferroelectric capacitor 28. Capacitor 24 is now in its initial or "0" state. The next positive pulse of the train causes the remanent polarization of capacitor 28 to be reversed through Zener diode 30 and diode 31, causing a second pulse 45 to be detected and delivered to output terminal 42. Diode 41 in detecting circuit 18 provides a path for the resetting negative pulses which reset ferroelectric capacitor 28 after each read-out to prevent these negative pulses from causing output pulses to be delivered through transistor 43 to output terminal 42. Source 46 supplies a suitable operating potential, such as plus 10 volts, through resistor 47 to the collector electrode of transistor 43 in the detector circuit 18.

Referring now to Fig. 2, there is depicted another exemplary embodiment of this invention in which ferroelectric capacitor 20 serves the dual purpose of metering the reversal of remanent polarization of capacitor 24 when it is receiving the coin indicating pulses and in metering the reversal of polarization of capacitor 24 when it is delivering the coin indicating pulses to the central office. Assume that the subscriber lifts the handset, not shown, which is a part of transmitter and receiver circuits 34. In response thereto the central office 10 applies a direct current voltage from source 16 through the closed switch 17 to line 14 from pulse source 16. In response to the movement of armatures 21 and 22 to their lower contacts 25 by the totalizer 35 on deposit of a coin, the remanent polarization of ferroelectric capacitor 20 is reversed into ferroelectric capacitor 24. When armatures 21 and 22 are restored to the upward contacts 23, which in this embodiment is their normal position, the positive voltage from source 16 again resets capacitor 20 through Zener diode 30 and diode 31. In response to the next movement of armatures 21 and 22, the positive voltage reverses the remanent polarization of ferroelectric capacitor 20 into ferroelectric capacitor 24 thus effectively storing two pulses in ferroelectric capacitor 24. Armatures 21 and 22 now return to their normal or upward position against contacts 23.

In this specific embodiment, when subsequently switch 17 is opened and switch 38 closed to apply the sine wave from source 29 to line 14 to interrogate the coin subset circuitry, the first negative pulse of the train causes a portion of the remanent polarization of ferroelectric capacitor 24 to be reversed through diode 26 and the capacitor 20. The next positive pulse causes the remanent polarization of capacitor 20 to be reversed through Zener diode 30 and diode 31, causing a pulse to be delivered over line 15 to output terminal 42. In response to the next negative pulse of the pulse train, a portion of the remanent polarization of ferroelectric capacitor 24 is again reversed through diode 26 into capacitor 20. In response to the next subsequent pulse, the remanent polarization of capacitor 20 is again reversed through Zener diode 30 and diode 31 causing a second negative going pulse to be delivered to output terminal 42. Here again, two positive output pulses such as pulses 44 and 45 are delivered to output terminal 42 in response to the deposit of a dime in the coin box.

In response to pulses 44 and 45, suitable circuitry, not shown, may apply dial tone to line 14 and connect line 14 to an appropriate register in the central office, and the dialing operation may proceed in ways well known in the art.

It is to be understood that the above-described arrangements are illustrative of the application of the principles of the invention. Numerous other arrangements may be devised by those skilled in the art without departing from the spirit and scope of the invention.

What is claimed is:

1. An electrical circuit for a pay telephone station comprising a first ferroelectric capacitor, a pair of conductors, switch means for connecting said first capacitor relative to said conductors in first one and then the other direction, a second ferroelectric capacitor, means including said switch means connecting said second capacitor in series with said first capacitor at least when said first capacitor is connected across said conductors in said other direction, and means connecting said second capacitor across said conductors to enable pulsing of said second capacitor by said conductors to cause partial charge reversals of said second capacitor.

2. An electrical circuit in accordance with claim 1 wherein said second ferroelectric capacitor has electrodes of many times the area of said first ferroelectric capacitor.

3. An electrical circuit for a pay telephone station comprising a first ferroelectric capacitor, a pair of conductors, switch means for connecting said first capacitor relative to said conductors in first one and then the other direction, a second ferroelectric capacitor having electrodes of many times the area of said first ferroelectric capacitor, means including said switch means connecting said second capacitor in series with said first capacitor at least when said first capacitor is connected across said conductors in said other direction, and means connecting said second capacitor across said conductors to enable pulsing of said second capacitor by said conductors, said last named means including charge metering means in series with said second capacitor across said conductors, and diode means parallel with said second capacitor.

4. An electrical circuit in accordance with claim 3 wherein said charge-metering means comprises a third capacitor of the same electrode area as said first capacitor.

5. An electrical circuit in accordance with claim 3 wherein said charge-metering means comprises said first ferroelectric capacitor.

6. An electrical circuit for a pay telephone station comprising a pair of conductors, a first ferroelectric capacitor, a second ferroelectric capacitor having an electrode area many times that of said first capacitor, said first capacitor normally being connected in series in one direction with said second capacitor across said conductors, coin actuated switch means for connecting said first capacitor oppositely in series with said second capacitor across said conductors, and diode means in parallel with said second capacitor.

7. In a telephone system, a pair of conductors, a first ferroelectric capacitor, a second ferroelectric capacitor having an electrode area larger than that of said first capacitor, means for applying a voltage to one of said conductors, means for applying said voltage to said first capacitor to effect reversal of its state of polarization, switch means operable on deposit of coins to connect said capacitors in series across said conductors, said voltage then returning said first capacitor to its initial state of polarization, and means for applying an alternating current to said one conductor to pulse said second capacitor.

8. In a telephone system, the combination of claim 7 wherein said switch means is actuated a number of times dependent on the monetary value of the coins deposited, the remanent polarization of said first capacitor being reversed and returned to its initial state on each complete operation of said switching means.

9. In a telephone system, the combination of claim 8 further comprising charge-metering means in series with said second capacitor on application of said alternating current thereto and diode means across said second capacitor.

10. In a telephone system, the combination of claim 9 wherein said charge-metering means comprises a third ferroelectric capacitor having the same electrode area as said first capacitor.

11. In a telephone system, the combination of claim 9 wherein said charge-metering means comprises said first ferroelectric capacitor, said switch means normally connecting said first and second capacitors in series with said first capacitor in one direction but being operable to connect said capacitors in series with said first capacitor in the opposite direction.

12. An electrical circuit for indicating the value of coins deposited in a telephone pay station comprising a first ferroelectric capacitor, a pair of conductors comprising a telephone line, means including a voltage source also connected to said first ferroelectric capacitor for applying a voltage to one of said conductors, a pulse-detecting circuit connected to the other of said conductors, a second ferroelectric capacitor having an electrode area which is many times larger than the electrode area of said first ferroelectric capacitor, switch means actuated by said coins for connecting said first ferroelectric capacitor in one direction to said second capacitor, means including said switch means for reversing the connection of said first ferroelectric capacitor with respect to said voltage source, and means for pulsing said second ferroelectric capacitor in discrete steps to apply pulses to said second conductor and said pulse-detecting circuit dependent on the monetary value of the deposited coins.

13. An electrical circuit for a coin telephone subset including a first and a second conductor, a first and a second ferroelectric capacitor, contact means for reversing the connections of said first capacitor with respect to said conductors a number of times indicative of the monetary total of the coins deposited in said subset and for connecting said capacitors in series, the electrode area of said second capacitor being many times larger than the electrode area of said first capacitor, diode means connected to said second capacitor for controlling the direction of current flow relative to said second capacitor, and means connected to said conductors for switching said first capacitor and for detecting the number of times that said first capacitor is switched into said second capacitor thereby indicating the monetary total of the coins deposited in said subset.

14. In a telephone system, a pulse source, a voltage source, a pulse-detecting circuit, a pair of conductors connected to said sources and said circuit, a first ferroelectric capacitor, switch means actuated by coins deposited in a pay station for reversing the connection of said first capacitor with respect to said conductors, a second ferroelectric capacitor having an electrode area many times larger than the electrode area of said first ferroelectric capacitor and connected by said switch means to said first capacitor, and unilateral impedance means in series with said second ferroelectric capacitor.

15. An electrical circuit comprising a first ferroelectric capacitor, a pair of conductors, said first capacitor having a connection to one of said conductors, means for applying a voltage to said one of said conductors, a second ferroelectric capacitor having an electrode area which is many times larger than the electrode area of said first ferroelectric capacitor, switch means for connecting said first ferroelectric capacitor in one direction to said second capacitor a plurality of times, means including said switch means for reversing the connection of said first ferroelectric capacitor with respect to said voltage on said one conductor, and means for pulsing said second ferroelectric capacitor in discrete steps to apply pulses to said second conductor indicative of the number of actuations of said switch means.

16. An electrical circuit comprising a first ferroelectric capacitor having one electrode area, a voltage source, means for connecting said first capacitor to said voltage source in one direction to induce a remanent charge in said first capacitor, a second ferroelectric capacitor having an electrode area larger than said one electrode area, means responsive to successive occurrences for periodically connecting said first capacitor to said voltage source in the opposite direction and to said second capacitor to induce a plurality of successive remanent charges in said second capacitor, pulsing means for subsequently applying switching pulses to said second capacitor to cause successive charge reversals in said second capacitor, and means responsive to said charge reversals for generating output signals corresponding to said successive occurrences.

17. An electrical circuit as claimed in claim 16, also comprising means for metering said charge reversals in said second capacitor.

18. An electrical circuit as claimed in claim 16 in which said last-mentioned means comprises a third ferroelectric capacitor having said one electrode area for metering said charge reversals, said third capacitor periodically having a charge induced therein responsive to said charge reversals in said second capacitor and having its charge periodically reversed responsive to said switching pulses, and an output circuit means periodically energized responsive to charge reversals in said third capacitor for generating said output signals.

19. An electrical circuit as claimed in claim 16 in which said last-mentioned means comprises said first ferroelectric capacitor for metering said charge reversals, said first capacitor periodically having a charge induced therein responsive to said charge reversals in said second capacitor and having its charge periodically reversed responsive to said switching pulses, and an output circuit means periodically energized responsive to charge reversals in said first capacitor for generating said output signals.

References Cited in the file of this patent

UNITED STATES PATENTS

| | | |
|---|---|---|
| 2,194,072 | Humphries | Mar. 10, 1940 |
| 2,623,631 | Armor et al. | Dec. 30, 1952 |